(12) United States Patent
Hardaker et al.

(10) Patent No.: US 7,175,168 B2
(45) Date of Patent: Feb. 13, 2007

(54) WING POSITIONER FOR INSTALLING AND REMOVING AN AIRCRAFT WING

(76) Inventors: John C. Hardaker, 504 E. Main St., Dundee, FL (US) 33838; Samuel L. Rosenberger, P.O. Box 5145, Lakeland, FL (US) 33807-5145

( * ) Notice: Subject to any disclaimer, the term of this patent is extended or adjusted under 35 U.S.C. 154(b) by 0 days.

(21) Appl. No.: 11/138,696

(22) Filed: May 26, 2005

(65) Prior Publication Data

US 2006/0266885 A1    Nov. 30, 2006

(51) Int. Cl.
*B23Q 3/00* (2006.01)
(52) U.S. Cl. ............. 269/17; 244/1 R; 244/123.1; 244/131; 414/11; 29/430; 269/909
(58) Field of Classification Search .......... 244/117 R, 244/119, 123.1, 124, 131, 1 R; 29/430; 269/17, 269/909; 414/11, 589, 546
See application file for complete search history.

(56) References Cited

U.S. PATENT DOCUMENTS

| | | | | |
|---|---|---|---|---|
| 2,405,544 A | * | 8/1946 | Anjeskey | 29/430 |
| 2,431,589 A | * | 11/1947 | Shuler, Jr. | 269/17 |
| 2,815,132 A | * | 12/1957 | Stone | 414/11 |
| 3,012,737 A | * | 12/1961 | Dodd | 244/2 |
| 3,306,578 A | * | 2/1967 | Meeks et al. | 269/17 |
| 3,640,491 A | * | 2/1972 | Harrison | 244/117 R |
| 4,269,374 A | * | 5/1981 | Miller | 244/2 |
| 4,440,265 A | | 4/1984 | Spagnoli | |
| 4,461,455 A | | 7/1984 | Mills et al. | |
| 4,810,151 A | * | 3/1989 | Shern | 414/11 |
| 4,932,639 A | | 6/1990 | Fjellstrom | |
| 5,662,315 A | | 9/1997 | Neiss et al. | |
| 6,024,348 A | * | 2/2000 | Ventura et al. | 269/17 |
| 6,065,924 A | * | 5/2000 | Budd et al. | 414/546 |
| 6,231,034 B1 | | 5/2001 | Walker et al. | |

* cited by examiner

Primary Examiner—Galen Barefoot
(74) Attorney, Agent, or Firm—William M. Hobby, III

(57) ABSTRACT

A wing positioner apparatus for installing and removing an aircraft wing includes a wheeled base having a pair of vertically extending telescoping posts attached thereto. A wing support arm is hinged to each vertically extending telescoping post. A winch couples one wing support arm to one of the vertically extending posts for raising and lowering the wing support arm. A telescoping post winch is attached to the wheeled base for raising both vertically extending telescoping posts simultaneously. This allows an aircraft wing to be supported between the pair of wing support arms and the pair of vertically extending telescoping posts while being moved on the wheeled base and positioned for installation or removal from an aircraft fuselage.

7 Claims, 4 Drawing Sheets

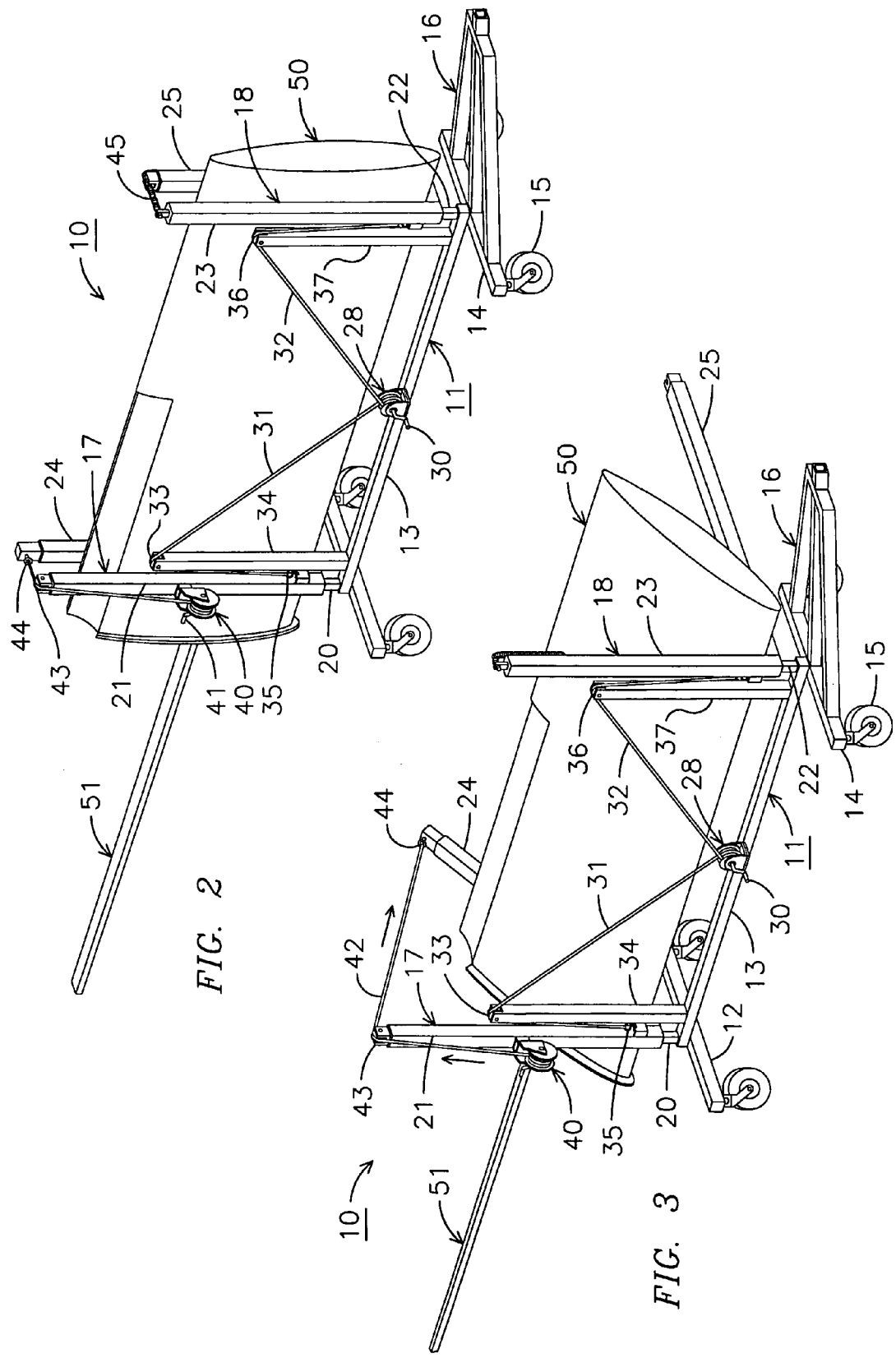

WING POSITIONER FOR INSTALLING AND REMOVING AN AIRCRAFT WING

BACKGROUND OF THE INVENTION

The present invention relates to a workpiece positioner for installing and removing a workpiece and especially to an aircraft wing positioner for installing or removing an aircraft wing from an aircraft fuselage.

In the past, there have been numerous devices for supporting and transporting a workpiece to a job site and positioning the workpiece for attachment to machinery or the like. For instance, the workpiece transporters and positioners can be seen for transporting and mounting doors to the jamb of a doorway. This assists carpenters in fitting and hanging doors to door openings in buildings. One such door mounting apparatus can be seen in U.S. Pat. No. 6,231,034 which transports a door on a wheeled frame and positions the door for attaching the hinges. It is also common to use workpiece transports for attaching automobile parts during the production or repair of automobiles, such as in the transport and attachment of a car door or bumper. In U.S. Pat. No. 5,662,315 for a Bumper Holder, a bumper holder is used for holding a detached automobile bumper. In the Fjellstrom U.S. Pat. No. 4,932,639, a door and body jack is illustrated for supporting automobile body parts for removal, installation and servicing of the parts. A T-shaped dolly support has a vertical standard on which a support unit slides and which cradles the automobile part. In the Spagnolia U.S. Pat. No. 4,440,265, a hydro-pneumatic positioner for removal or installation of wing engines for aircraft is used for the removal or installation of the wing engines of an aircraft. This positioner has a wheeled cart for supporting and moving the aircraft engine and a hydro-pneumatic system for hoisting the engine to a position for mounting the engine to an aircraft. In the Mills et al. U.S. Pat. No. 4,461,455, an aircraft engine lifting and positioning apparatus is provided for lifting and positioning aircraft engines during installation. Wing mounted engines of large transport airplanes are periodically removed for servicing and maintenance and these types of lifting and positioning devices are used during the servicing and maintenance of airplane engines.

The present invention is specifically directed towards a wing positioner for installing and/or removing an aircraft wing and includes a wheeled base for moving an attached wing to a desired location with means for positioning the wing for installing to an aircraft fuselage. The aircraft wing is supported between a wing support arm and a vertically extending telescoping post. It is moved into position on a wheeled base and positioned for installation or removal from an aircraft fuselage with a pair of telescoping posts and hinged wing support arms.

SUMMARY OF THE INVENTION

A wing positioner apparatus for installing and removing an aircraft wing includes a wheeled base having a pair of vertically extending telescoping posts attached thereto. A wing support arm is hinged to each vertically extending telescoping post. A winch or other lifting means couples one wing support arm to one of the vertically extending telescoping posts for raising and lowering the wing support arm. A telescoping post lift or winch is attached to the wheeled base for raising both vertically extending telescoping posts simultaneously. This allows an aircraft wing to be supported between the pair of wing support arms and the pair of vertically extending telescoping posts while being moved on the wheeled base and positioned for installation or removal from an aircraft fuselage. The telescoping posts and hinged wing support arms can be raised and lowered simultaneously to position the wing and the hinged wing support arms can be lowered for attaching the wing to the fuselage.

BRIEF DESCRIPTION OF THE DRAWINGS

Other objects, features, and advantages of the present invention will be apparent from the written description and the drawings in which:

FIG. 2 is a perspective view of the wing positioner of FIG. 1 supporting an aircraft wing;

FIG. 3 is a perspective view of the wing positioner in accordance with FIG. 2 with the wing being lowered;

DESCRIPTION OF THE PREFERRED EMBODIMENT

Figure 1:
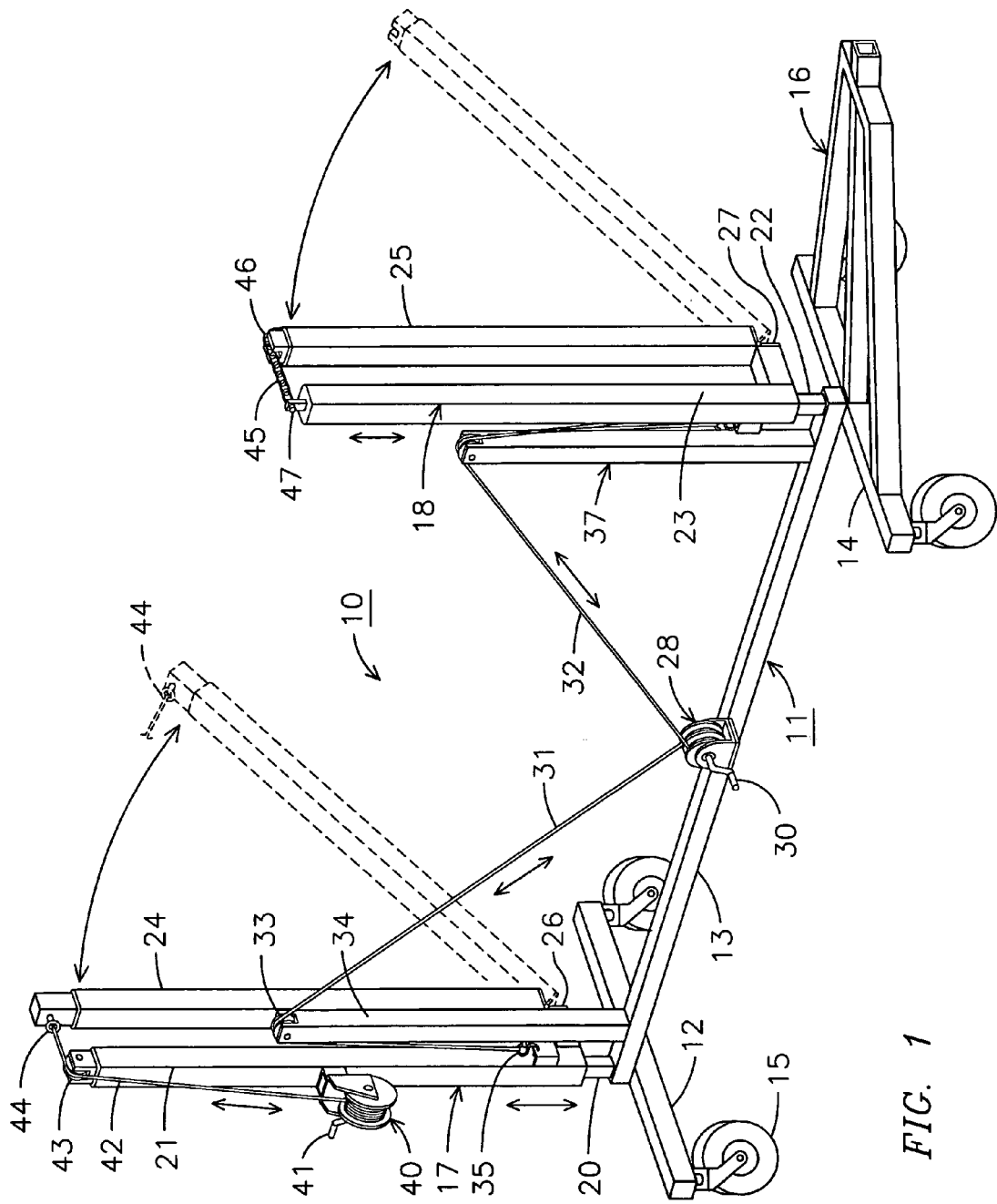
FIG. 1 is a perspective view of a wing positioner for installing an aircraft wing in accordance with the present invention.

Referring to the drawings, FIGS. 1 through 5, a wing positioner 10 for installing and/or removing an aircraft wing includes a base 11. The wheeled frame has a center frame member 13 connecting wheeled frame members 12 and 14 and has a plurality of wheels 15 attached thereto to form a rolling base. The frame 11 has a tongue 16 connected to frame member 14. A pair of telescoping upright posts 17 and 18 are attached to the wheeled base 11. Post 17 has a rigid post portion 20 and a telescoping post portion 21 while post 18 has a rigid post portion 22 fixedly attached to the base 11 and a telescoping post portion 23. A pair of wing supporting arms 24 and 25 are hinged with hinges 26 and 27 to the post 17 and 18, respectively. A telescoping post lift or winch 28 is attached to the base frame 11 frame member 13 and has a handle 30 and is operated to pull or release cables 31 and 32 simultaneously. Cable 31 wraps around a pulley 33 on a pulley support post 34 and is attached with an eye 35 on the vertical post 17 telescoping member 21. The cable 32 in turn is attached over a pulley 36 on a post 37 which is fixedly attached to the frame member 11 adjacent the telescoping post 18. The cable 32 is attached to an eye on the sliding post member 23 on the telescoping post 18. Thus, turning the handle 30 of the winch 28 simultaneously lifts or releases the cables 31 and 32 which in turn will lift the telescoping sections 21 of telescoping post 17 and telescoping section 23 of telescoping post 18 to raise or lower the post members 21 or 23 simultaneously. The wing support arms 24 and 25 are hinged to the post 17 and 18, telescoping members 21 and 23 and are raised or lowered with the post members.

A winch 40 has a handle 41 is attached to the telescoping post 17, telescoping member 21 and has a cable 42 attached thereto which rides over a pulley 43 attached to the top of the telescoping member 21 and is connected to an eye 44 at the top end of the wing support arm 24. Thus, rotating the handle 41 of the winch 40 will pull or release the cable 42 to raise or lower the wing support arm 24. The wing support arm 25 is removably connected by a spring or cable 45 to an eye 46 at the end of the wing support arm 25. Spring 45 is connected to an eye 47 attached to the top of the telescoping member 23 of the telescoping post 18.

Figure 4:
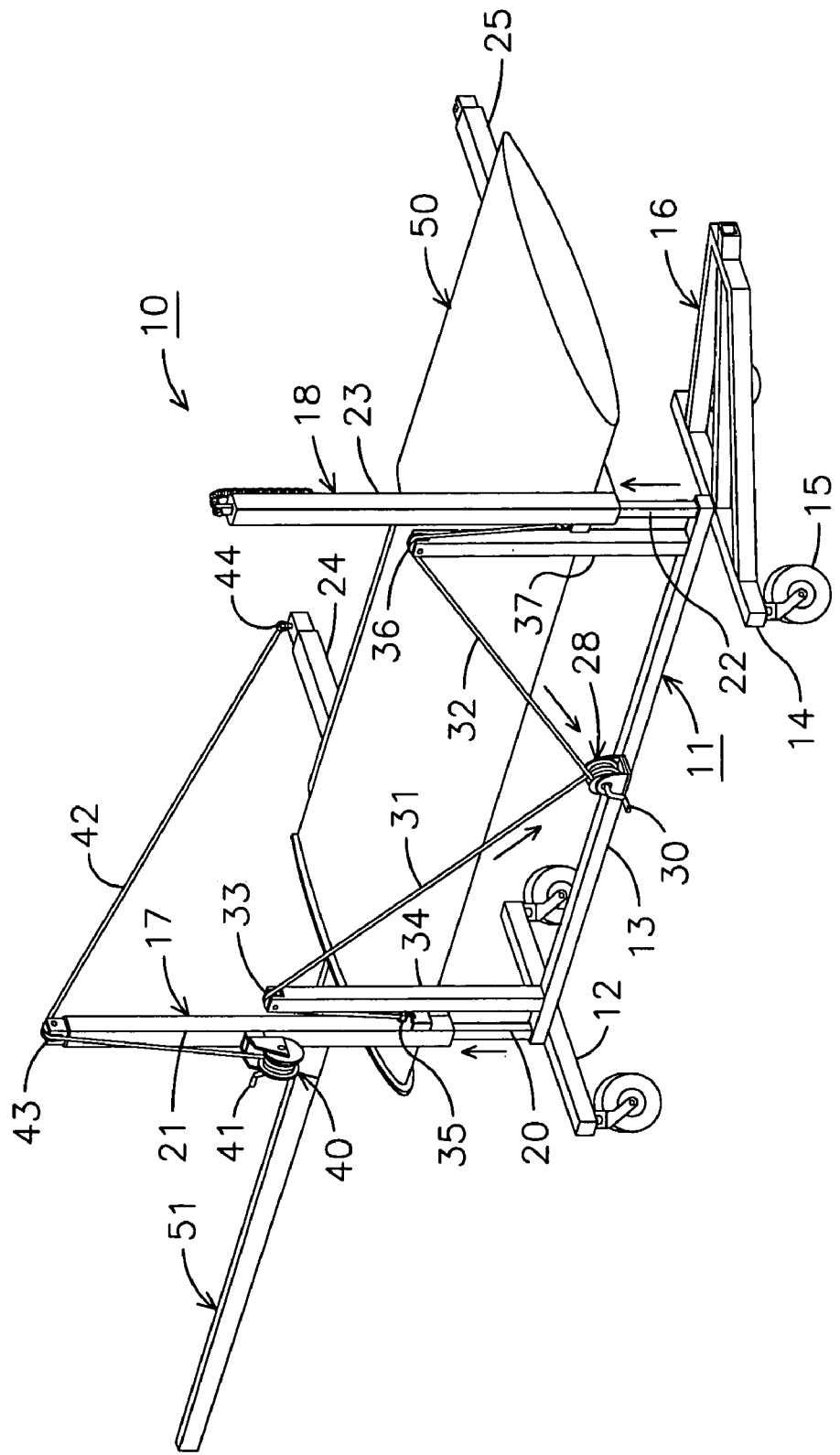
FIG. 4 is a perspective view of the wing positioner of FIGS. 2 and 3 having the wing lowered to a horizontal position.
Figure 5:
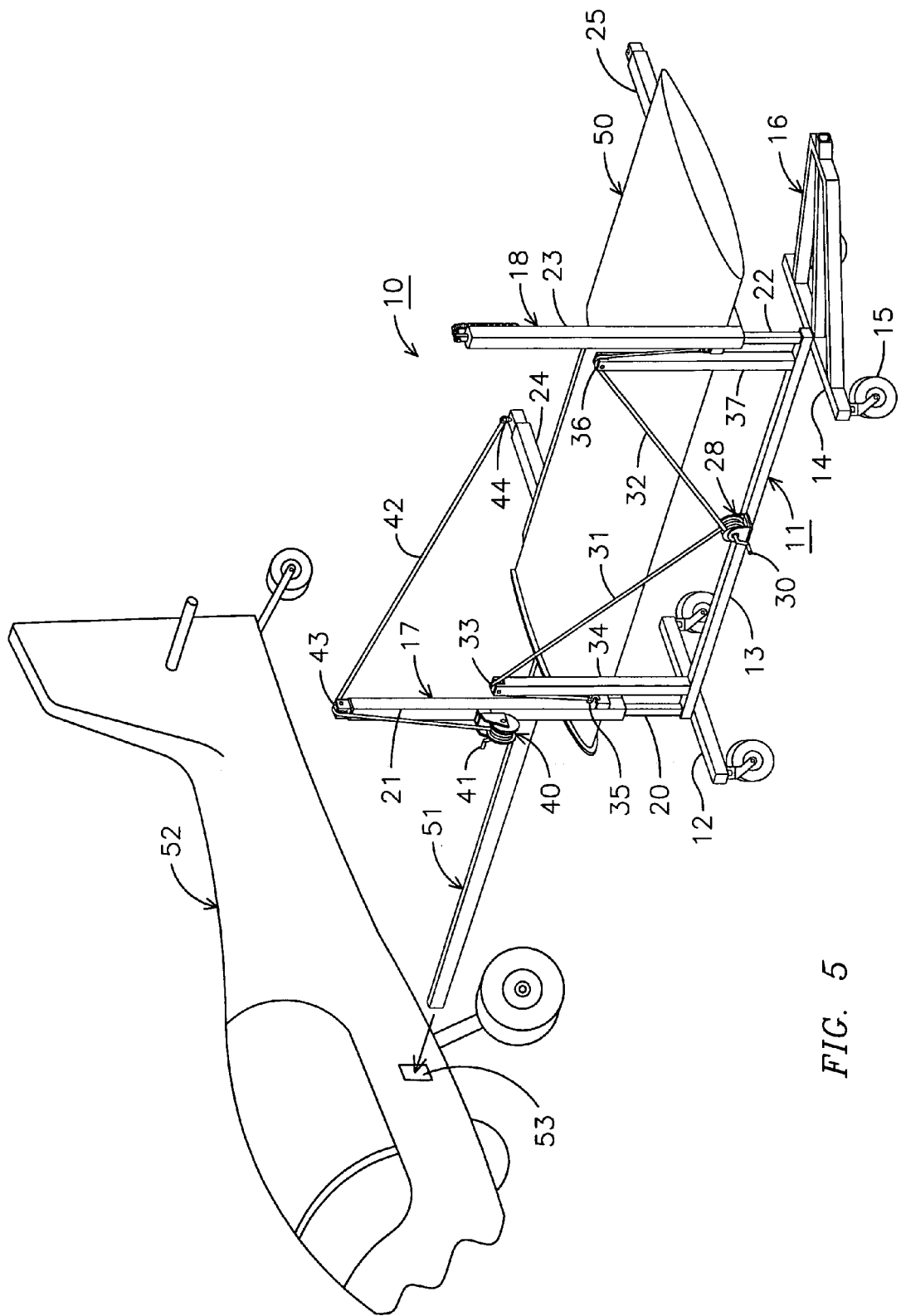
FIG. 5 is a perspective view of the wing positioner of FIGS. 2 through 4 with a flattened wing positioned adjacent an aircraft fuselage.

In operation, as illustrated in FIGS. 2 through 5, an airplane wing 50 is shown supported on a wing positioner 10 between the wing supporting arms 24 and 25 and the vertically extending telescoping posts 17 and 18. The wing 50 has the wing supporting arm 51 extending therefrom in a transportable position. As shown in FIG. 2, the wing can be wheeled on the wing positioner 10 by pulling the tongue 16 to pull the wing positioner on the wheels 15 to the proper position for attaching to a plane's fuselage 52, as illustrated in FIG. 5. Once the wing positioner is wheeled into position, the wing can be lowered to a more horizontal position by activating the winch 40 to release the cable 42 to drop the arm 24 after unhooking the spring 45 to allow the arm 25 to drop. The wing is shown partly dropped in FIG. 3 and in a horizontal position in FIG. 4. The winch 28 is then operated through the handle 30, as shown in FIG. 4, to lift the telescoping members 21 of telescoping post 17 and 23 of telescoping post 18 which simultaneously raises or lowers the post members 21 and 23 with the single winch movement of the winch 28 to align the wing 50 attaching arm 51 with the opening of the wing support channel 53 in the fuselage 52. Once aligned, the wing supporting post 51 can be inserted through the channel 53 for attaching the wing to the fuselage 52.

The wing 50 can be easily removed from the plane's fuselage by reversing the procedure to place the wing positioner 10 under the wing to support it when it has been freed from the fuselage. The wing is then folded up by raising the wing support ram 24 for transporting the wing on the wheeled wing positioner 10.

It should be clear at this time that a wing positioner has been provided for the installation and transporting of a wing for attaching to an airplane fuselage and which can also be utilized for removing the wing for repair and maintenance as desired. The wing positioner allows the wing to be transported and installed on an airplane by one person who can easily both install or remove a wing without the help of other individuals which would otherwise be required.

However, the present invention is not to be construed as limited to the forms shown which are to be considered illustrative rather than restrictive.

We claim:

1. A wing positioner for installing and removing an aircraft wing comprising:
    a wheeled base;
    a pair of vertically extending telescoping posts attached to said wheeled base in a spaced relationship to each other, each said telescoping post having a telescoping arm;
    a pair of wing support arms, each said wing support arm being hinged to one said vertically extending telescoping posts;
    a wing support arm lifting means for raising and lowering one said wing support arm on said telescoping post;
    a telescoping post lifting means for raising and lowering both said telescoping arms and hinged wing support arms at the same time;
    whereby an aircraft wing can be supported between said wing support arm and said vertically extending telescoping post and moved on said wheeled base and positioned for installation or removal from an aircraft fuselage with said telescoping posts and hinged wing support arm.

2. The wing positioner in accordance with claim 1 in which said telescoping post lifting means is a winch for lifting said pair of telescoping posts and attached wing support arms together.

3. The wing positioner in accordance with claim 2 in which said wing support arm lifting means is a winch for lifting said wing support arm on a hinged connection on said telescoping post.

4. The wing positioner in accordance with claim 3 in which said telescoping posts winch is mounted to said base and raises both telescoping posts simultaneously to raise and lower a wing supported thereon.

5. The wing positioner in accordance with claim 4 in which said wing support arm winch is mounted on said base.

6. The wing positioner in accordance with claim 5 in which said wing support arm winch is mounted on one said telescoping post to lift one said hinged wing support arm.

7. The wing positioner in accordance with claim 6 in which said other wing support arm has a spring connecting said second telescoping post thereto.

* * * * *